United States Patent
Miyabe et al.

(10) Patent No.: US 11,254,818 B2
(45) Date of Patent: Feb. 22, 2022

(54) RESIN COMPOSITION, FORMED ARTICLE, AND FILM

(71) Applicant: Mitsubishi Gas Chemical Company, Inc., Tokyo (JP)

(72) Inventors: Takanori Miyabe, Hiratsuka (JP); Takafumi Oda, Hiratsuka (JP); Kazuya Sato, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 120 days.

(21) Appl. No.: 16/649,057

(22) PCT Filed: Sep. 6, 2018

(86) PCT No.: PCT/JP2018/033049
§ 371 (c)(1),
(2) Date: Mar. 19, 2020

(87) PCT Pub. No.: WO2019/058986
PCT Pub. Date: Mar. 28, 2019

(65) Prior Publication Data
US 2020/0270453 A1    Aug. 27, 2020

(30) Foreign Application Priority Data

Sep. 22, 2017 (JP) .............................. JP2017-181922

(51) Int. Cl.
*C08L 77/06* (2006.01)
*C08J 5/18* (2006.01)
*C08L 77/10* (2006.01)

(52) U.S. Cl.
CPC .............. *C08L 77/06* (2013.01); *C08J 5/18* (2013.01); *C08L 77/10* (2013.01); *C08L 2201/10* (2013.01); *C08L 2201/14* (2013.01); *C08L 2203/16* (2013.01); *C08L 2205/02* (2013.01)

(58) Field of Classification Search
CPC ...... C08L 77/06; C08L 77/10; C08L 2205/02; C08L 2205/025
See application file for complete search history.

(56) References Cited

U.S. PATENT DOCUMENTS

| 4,728,549 A | 3/1988 | Shimizu et al. |
| 4,908,272 A * | 3/1990 | Harada .................. B32B 27/34 428/412 |
| 4,983,719 A | 1/1991 | Fox et al. |
| 2015/0225541 A1 | 8/2015 | Oda et al. |
| 2017/0343158 A1 | 11/2017 | Kato et al. |
| 2018/0296437 A1 | 10/2018 | Arakawa et al. |
| 2018/0334539 A1 | 11/2018 | Kato et al. |

FOREIGN PATENT DOCUMENTS

| JP | S60-238355 A | 11/1985 |
| JP | S61-108542 A | 5/1986 |
| JP | S63-267549 A | 11/1988 |
| JP | H03-103438 A | 4/1991 |
| JP | 2010-248417 A | 11/2010 |
| JP | 2014-047289 A | 3/2014 |
| JP | 2016-102546 A | 6/2016 |
| WO | 2017/061356 A1 | 4/2017 |
| WO | 2017/090556 A1 | 6/2017 |

OTHER PUBLICATIONS

Extended European Search Report issued in corresponding European Application No. 18857881.9 dated Oct. 16, 2020 (6 pages).
International Preliminary Report on Patentability and Written Opinion for PCT/JP2018/033049, dated Nov. 6, 2018, and English Translation submitted herewith (11 pages).
International Search Report for PCT/JP2018/033049, dated Nov. 6, 2018, and English Translation submitted herewith (5 pages).
Office Action issued in corresponding Chinese Application No. 201880060394.6 dated Dec. 31, 2021 (7 pages).

* cited by examiner

*Primary Examiner* — Ana L. Woodward
(74) *Attorney, Agent, or Firm* — Fitch, Even, Tabin & Flannery LLP

(57) ABSTRACT

A resin composition which has oxygen-barrier properties less apt to depend on humidity and has high transparency; and a formed article and a film which include the resin composition are provided. The resin composition includes from 10 to 90 parts by mass of a polyamide resin (A) and from 90 to 10 parts by mass of a polyamide resin (B), wherein the polyamide resin (A) includes constituent units derived from a diamine and constituent units derived from a dicarboxylic acid, with 70 mol % or more of the constituent units derived from a diamine being derived from xylylenediamine and 90 mol % or more of the constituent units derived from a dicarboxylic acid being derived from adipic acid; the polyamide resin (B) includes constituent units derived from a diamine and constituent units derived from a dicarboxylic acid, 70 mol % or more of the constituent units derived from a diamine being derived from xylylenediamine, from 30 to 65 mol % of the constituent units derived from a dicarboxylic acid being derived from an α,ω-linear chain aliphatic dicarboxylic acid having from 4 to 20 carbons, and from 70 to 35 mol % of the constituent units derived from a dicarboxylic acid being derived from isophthalic acid.

20 Claims, No Drawings

RESIN COMPOSITION, FORMED ARTICLE, AND FILM

CROSS-REFERENCE TO RELATED APPLICATIONS

This application is a U.S. national phase application filed under 35 U.S.C. § 371 of International Application Number PCT/JP2018/033049, filed Sep. 6, 2018, designating the United States, which claims priority from Japanese Application Number 2017-181922, filed Sep. 22, 2017.

FIELD OF THE INVENTION

The present invention relates to a resin composition, as well as a formed article and a film for which the resin composition is used.

In particular, the present invention relates to a resin composition using a polyamide resin.

BACKGROUND OF THE INVENTION

Polymetaxylyleneadipamide (MXD6), a polyamide resin with excellent mechanical strength, is useful as a packaging material due to its excellent oxygen-barrier properties. For example, Patent Document 1 describes using MXD6 in a layer formed from a gas barrier resin.

Furthermore, Patent Document 2 discloses a polyamide resin, which is obtained by reacting xylylenediamine, isophthalic acid, and adipic acid, as a polyamide resin with excellent oxygen-barrier properties (Patent Document 2).

CITATION LIST

Patent Literature

Patent Document 1: JP 61-108542 A
Patent Document 2: WO 2017/090556

SUMMARY OF INVENTION

As described above, MXD6 has excellent oxygen-barrier properties, however, in recent years there has been a demand for even better oxygen-barrier performance. In particular, it is desired that the oxygen-barrier properties thereof do not change depending on humidity. In addition, even if the oxygen-barrier properties are not prone to change with humidity, it will be problematic if the transparency worsens. In particular, there are various uses where oxygen-barrier properties are required, and provision of new materials is desired.

An object of the present invention is to solve such a problem and to provide a resin composition which has oxygen-barrier properties that are less apt to depend on humidity and has high transparency, and a formed article and a film for which the resin composition is used.

Based on the above problem, the present inventors, through examination, discovered that the above problem can be solved by blending a polyamide resin which is obtained by reacting xylenediamine, isophthalic acid, and adipic acid, with MXD6. Specifically, the problem described above is solved by the following solution <1>, and preferably by the following solutions <2> to <13>.

<1> A resin composition including from 10 to 90 parts by mass of a polyamide resin (A) and from 90 to 10 parts by mass of a polyamide resin (B), wherein the polyamide resin (A) includes constituent units derived from a diamine and constituent units derived from a dicarboxylic acid, 70 mol % or more of the constituent units derived from a diamine being derived from xylylenediamine and more than 90 mol % of the constituent units derived from a dicarboxylic acid being derived from adipic acid; the polyamide resin (B) includes constituent units derived from a diamine and constituent units derived from a dicarboxylic acid, 70 mol % or more of the constituent units derived from a diamine being derived from xylylenediamine, from 30 to 65 mol % of the constituent units derived from a dicarboxylic acid being derived from an α,ω-linear chain aliphatic dicarboxylic acid having from 4 to 20 carbons, and from 70 to 35 mol % of the constituent units derived from a dicarboxylic acid being derived from isophthalic acid, where the total does not exceed 100 mol %.

<2> The resin composition according to <1>, wherein 70 mol % or more of the constituent units derived from a diamine in the polyamide resin (A) is derived from metaxylylenediamine.

<3> The resin composition according to <1> or <2>, wherein 70 mol % or more of the constituent units derived from a diamine in the polyamide resin (B) is derived from metaxylylenediamine.

<4> The resin composition according to any one of <1> to <3>, wherein from 30 to 90 mol % of the constituent units derived from a dicarboxylic acid in the polyamide resin (B) is derived from adipic acid.

<5> The resin composition according to <1> including from 20 to 80 parts by mass of the polyamide resin (A) and from 80 to 20 parts by mass of the polyamide resin (B), wherein 90 mol % or more of the constituent units derived from a diamine in the polyamide resin (A) is derived from metaxylylenediamine, 90 mol % or more of the constituent units derived from a diamine in the polyamide resin (B) is derived from metaxylylenediamine, from 30 to 65 mol % of the constituent units derived from a dicarboxylic acid in the polyamide resin (B) is derived from adipic acid, and from 70 to 35 mol % of the constituent units derived from a dicarboxylic acid in the polyamide resin (B) is derived from isophthalic acid.

<6> The resin composition according to any one of <1> to <5>, wherein from 30 to 59 mol % of the constituent units derived from a dicarboxylic acid in the polyamide resin (B) is derived from adipic acid and from 70 to 41 mol % of the constituent units derived from a dicarboxylic acid in the polyamide resin (B) is derived from isophthalic acid.

<7> The resin composition according to any one of <1> to <6>, wherein the polyamide resin (A) is a crystalline polyamide resin, the polyamide resin (B) is an amorphous polyamide resin, and 60 mol % or more of the constituent units constituting the polyamide resin (A) and 60 mol % or more of the constituent units constituting the polyamide resin (B) are common.

<8> The resin composition according to any one of <1> to <7>, wherein the polyamide resin (B) is an amorphous polyamide resin.

<9> The resin composition according to any one of <1> to <8>, wherein an Mw/Mn, which is the degree of dispersion of the polyamide resin (B), is from 1.5 to 3.5.

<10> A formed article formed from the resin composition described in any one of <1> to <9>.

<11> A formed article having a layer made from the resin composition described in any one of <1> to <9>.

<12> A film formed from the resin composition described in any one of <1> to <9>.

<13> The film according to <12>, wherein the film is stretched.

According to the present invention, it is possible to provide: a resin composition which has oxygen-barrier properties less apt to depend on humidity and has high transparency; and a formed article and a film for which the resin composition is used.

DESCRIPTION OF EMBODIMENTS

The contents of the present invention will be described in detail below. Note that, in the present specification, "from . . . to . . . " is used to mean that the given numerical values are included as the lower limit value and the upper limit value, respectively.

The resin composition of the present invention is characterized by that the resin composition includes from 10 to 90 parts by mass of a polyamide resin (A) and from 90 to 10 parts by mass of a polyamide resin (B), wherein the polyamide resin (A) includes constituent units derived from a diamine and constituent units derived from a dicarboxylic acid, 70 mol % or more of the constituent units derived from a diamine being derived from xylylenediamine and more than 90 mol % of the constituent units derived from a dicarboxylic acid being derived from adipic acid, and the polyamide resin (B) includes constituent units derived from a diamine and constituent units derived from a dicarboxylic acid, 70 mol % or more of the constituent units derived from a diamine being derived from xylylenediamine, from 30 to 65 mol % of the constituent units derived from a dicarboxylic acid being derived from an α,ω-linear chain aliphatic dicarboxylic acid having from 4 to 20 carbons, from 70 to 35 mol % of the constituent units derived from a dicarboxylic acid being derived from isophthalic acid, where the total does not exceed 100 mol %. By adopting such a constitution, a resin composition with oxygen-barrier properties less apt to depend on humidity and a high transparency could be obtained. It is presumed that, in both the polyamide resin (A) and the polyamide resin (B), 70 mol % or more of the constituent units derived from a diamine is xylylenediamine, and thus the polyamide resin (A) and the polyamide resin (B) have excellent miscibility with each other, resulting in improvement in transparency. Furthermore, by compounding the polyamide resin (B), it is presumed that the oxygen-barrier properties successfully become less apt to change with humidity.

Polyamide Resin (A)

The polyamide resin (A) used in an embodiment according to the present invention includes constituent units derived from a diamine and constituent units derived from a dicarboxylic acid, wherein 70 mol % or more of the constituent units derived from a diamine is derived from xylylenediamine and more than 90 mol % of the constituent units derived from a dicarboxylic acid is derived from adipic acid.

In the polyamide resin (A), preferably 80 mol % or more, more preferably 90 mol % or more, even more preferably 95 mol % or more, and yet even more preferably 99 mol % or more, of the constituent units derived from a diamine is derived from xylylenediamine. The xylylenediamine is preferably metaxylylenediamine and paraxylylenediamine, and more preferably metaxylylenediamine. An example of a preferred embodiment of the polyamide resin (A) of the present invention is a polyamide resin wherein at least 70 mol % of the constituent units derived from a diamine is derived from metaxylylenediamine.

Examples of the diamine that can be used as a raw material diamine component of the polyamide resin (A), other than xylylenediamine, include: aliphatic diamines, such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethyl-hexamethylenediamine; alicyclic diamines, such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having aromatic ring(s), such as bis(4-aminophenyl)ether, paraphenylenediamine, and bis(aminomethyl)naphthalene. One type or a combination of two or more types can be used.

In a case where a diamine other than xylylenediamine is used as the diamine component, its proportion relative to the constituent units derived from a diamine is not more than 30 mol %, preferably from 1 to 25 mol %, and more preferably from 5 to 20 mol %.

In the polyamide resin (A), preferably 95 mol % or more, and more preferably 99 mol % or more, of the constituent units derived from a dicarboxylic acid is derived from adipic acid.

Examples of the dicarboxylic acid that can be used as a raw material dicarboxylic acid component of the polyamide resin (A), other than adipic acid, include: aliphatic dicarboxylic acids, such as succinic acid, glutaric acid, pimelic acid, suberic acid, azelaic acid, sebacic acid, undecanedioic acid, and dodecanedioic acid; phthalic acid compounds, such as isophthalic acid, terephthalic acid, and orthophthalic acid; naphthalene dicarboxylic acid compounds, such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid. One type or a combination of two or more types can be used.

In a case where a dicarboxylic acid other than adipic acid is used as the dicarboxylic acid component, its proportion relative to the constituent units derived from a dicarboxylic acid is less than 10 mol %, preferably from 1 to 8 mol %, and more preferably from 1 to 5 mol %.

Note that although the main components of the polyamide resin (A) are constituent units derived from a diamine and constituent units derived from a dicarboxylic acid, components other than these components are not completely excluded; it goes without saying that constituent units derived from a lactam such as ε-caprolactam and laurolactam, and constituent units derived from aliphatic aminocarboxylic acids such as aminocaproic acid and aminoundecanoic acid, may be included. Here, "main components" means that the total number of constituent units derived from a diamine and the constituent units derived from a dicarboxylic acid is the highest of all constituent units among the constituent units constituting the polyamide resin (A). In an embodiment of the present invention, the total of the constituent units derived from a diamine and the constituent units derived from a dicarboxylic acid in the polyamide resin (A) preferably accounts for 90% or more of all constituent units, more preferably 95% or more, and even more preferably 98% or more.

The number average molecular weight (Mn) of the polyamide resin (A) is preferably 10000 or more, and more preferably 15000 or more. The upper limit of the number average molecular weight of the polyamide resin (A) is not particularly limited, but may be, for example, 100000 and less, and may even be 50000 and less, or 40000 and less. The number average molecular weight in an embodiment of the present invention is measured in accordance with the method described in paragraph 0016 of WO 2017/090556, the contents of which are incorporated in this specification.

The polyamide resin (A), usually a crystalline resin, preferably has a melting point of from 190 to 300° C., more preferably from 200 to 270° C., and even more preferably from 210 to 250° C. The melting point in an embodiment of the present invention is measured in accordance with the description of paragraph 0017 of JP 2016-216661 A, the contents of which are incorporated in this specification.

The polyamide resin (A) used in an embodiment of the present invention preferably includes phosphorus atoms in a proportion of from 3 to 300 ppm by mass, more preferably in a proportion from 4 to 250 ppm by mass, and even more preferably in a proportion from 20 to 200 ppm by mass.

The resin composition of the present invention preferably includes from 10 to 90% by mass, and more preferably from 20 to 80% by mass, of the polyamide resin (A). One type or two or more types of the polyamide resin (A) may be included.

Polyamide Resin (B)

The polyamide resin (B) includes constituent units derived from a diamine and constituent units derived from a dicarboxylic acid, wherein 70 mol % or more of the constituent units derived from a diamine is derived from xylylenediamine, from 30 to 65 mol % of the constituent units derived from a dicarboxylic acid is derived from an α,ω-linear chain aliphatic dicarboxylic acid having from 4 to 20 carbons, from 70 to 35 mol % of the constituent units derived from a dicarboxylic acid is derived from isophthalic acid, and the total does not exceed 100 mol %. By compounding such a polyamide resin, transparency and oxygen-barrier properties can be further improved. The polyamide resin (B) used in an embodiment according to the present invention is typically an amorphous resin. By using an amorphous resin, the transparency can be further improved. An amorphous resin is a resin that does not have a definite melting point; specifically, the crystal melting enthalpy ΔHm is less than 5 J/g, preferably 3 J/g or less, and more preferably 1 J/g or less.

In the polyamide resin (B), preferably 70 mol % or more, more preferably 80 mol % or more, even more preferably 90 mol % or more, further more preferably 95 mol % or more, and yet even more preferably 99 mol % or more, of the constituent units derived from a diamine is derived from xylylenediamine. The xylylenediamine is preferably metaxylylenediamine and paraxylylenediamine, and more preferably metaxylylenediamine.

An example of a preferred embodiment of the polyamide resin (B) of the present invention is a polyamide resin wherein 70 mol % or more of the constituent units derived from a diamine is derived from metaxylylenediamine.

Examples of the diamine other than xylylenediamine include: aromatic diamines, such as paraphenylenediamine; aliphatic diamines, such as 1,3-bis(aminomethyl)cyclohexane, 1,4-bis(aminomethyl)cyclohexane, tetramethylenediamine, pentamethylenediamine, hexamethylenediamine, octamethylenediamine, and nonamethylenediamine. Only one type of these other diamines, or two or more types thereof may be used.

In a case where a diamine other than xylylenediamine is used as the diamine component, its proportion relative to the constituent units derived from a diamine is less than 30 mol %, preferably from 1 to 25 mol %, and more preferably from 5 to 20 mol %.

As described above, in an embodiment of the present invention, from 30 to 65 mol % of the constituent units derived from a dicarboxylic acid in the polyamide resin (B) is derived from an α,ω-linear chain aliphatic dicarboxylic acid having from 4 to 20 carbons, (preferably an α,ω-linear chain aliphatic dicarboxylic acid having from 4 to 8 carbons, more preferably adipic acid), and from 70 to 35 mol % of the constituent units derived from a dicarboxylic acid in the polyamide resin (B) is derived from isophthalic acid.

Of the total dicarboxylic acids constituting the constituent units derived from a dicarboxylic acid in the polyamide resin (B), the lower limit of the proportion of the isophthalic acid is 35 mol % or more, preferably 40 mol % or more, and more preferably 41 mol % or more. The upper limit of the proportion of the isophthalic acid is 70 mol % or less, preferably 67 mol % or less, more preferably 65 mol % or less, even more preferably 62 mol % or less, and yet even more preferably 60 mol % or less, and may be 58 mol % or less. It is preferable to adopt such a range because haze tends to further decrease.

Of the total dicarboxylic acids constituting the constituent units derived from a dicarboxylic acid in the polyamide resin (B), the lower limit of the proportion of the α,ω-linear chain aliphatic dicarboxylic acid having from 4 to 20 carbons (preferably an α,ω-linear chain aliphatic dicarboxylic acid having from 4 to 8 carbons, more preferably adipic acid) is 30 mol % or more, preferably 33 mol % or more, more preferably 35 mol % or more, even more preferably 38 mol % or more, and yet even more preferably 40 mol % or more, and may be 42 mol % or more. The upper limit of the proportion of the α,ω-linear chain aliphatic dicarboxylic acid having from 4 to 20 carbons is 65 mol % or less, preferably 60 mol % or less, and more preferably 59 mol % or less.

The α,ω-linear chain aliphatic dicarboxylic acid having from 4 to 20 carbons is, as described above, preferably an α,ω-linear chain aliphatic dicarboxylic acid having from 4 to 8 carbons.

Examples of the α,ω-linear chain aliphatic dicarboxylic acid having from 4 to 20 carbons that is preferably used as the raw material dicarboxylic acid component of the polyamide resin include: aliphatic dicarboxylic acids, such as succinic acid, glutaric acid, pimelic acid, suberic acid, azelaic acid, adipic acid, sebacic acid, undecanedioic acid, and dodecanedioic acid. One type or a combination of two or more types can be used. Among these, adipic acid is preferable because the melting point of the polyamide resin becomes suitable for molding processing.

Of the total dicarboxylic acids constituting the constituent units derived from a dicarboxylic acid in the polyamide resin (B), the total proportion of the isophthalic acid and the α,ω-linear chain aliphatic dicarboxylic acid having from 4 to 20 carbons is preferably 90 mol % or more, and more preferably 95 mol % or more, and even more preferably 98 mol % or more, and may be 100 mol %. By adopting such a proportion, the transparency of the resin composition in the present invention tends to be further improved.

Examples of the dicarboxylic acid other than isophthalic acid and an α,ω-linear chain aliphatic dicarboxylic acid having from 4 to 20 carbons include: phthalic acid compounds, such as terephthalic acid and orthophthalic acid; naphthalene dicarboxylic acid compounds, such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid. One type or a combination of two or more types can be used.

Preferably, the polyamide resin (B) is substantially free of constituent units derived from terephthalic acid. "Substantially free of" means that the molar quantity of the constituent units derived from terephthalic acid is 5 mol % or less, preferably 3 mol % or less, and more preferably 1 mol % or less of the isophthalic acid included in the polyamide resin (B). By adopting such a constitution, moderate forming processability is maintained, and the gas-barrier properties become less likely to change due to humidity.

Note that while the polyamide resin (B) used in an embodiment of the present invention includes the constituent units derived from a dicarboxylic acid and the constituent units derived from a diamine, it may also include other moieties such as constituent units other than the constituent units derived from a dicarboxylic acid and the constituent units derived from a diamine, or terminal groups. Examples of the other constituent units include, but are not limited to, constituent units derived from lactams, such as ε-caprolactam, valerolactam, laurolactam, and undecalactam, and aminocarboxylic acids, such as 11-aminoundecanoic acid and 12-aminododecanoic acid, and the like. Furthermore, the polyamide resin (B) used in an embodiment of the present invention may contain trace components such as additives used for synthesis. Usually, 95% by mass or more, preferably 98% by mass or more, of the polyamide resin (B) used in an embodiment of the present invention is the constituent units derived from a dicarboxylic acid or the constituent units derived from a diamine.

The number average molecular weight (Mn) of the polyamide resin (B) is preferably 8000 or more, and more preferably 10000 or more. The upper limit of the number average molecular weight of the polyamide resin (B) is not particularly limited, but may be, for example, 50000 and less, and may even be 30000 and less, or 20000 and less. An example of an embodiment of the present invention is a form in which the Mn of the polyamide resin (B) is smaller than the Mn of the polyamide resin (A). More preferably, the Mn of the polyamide resin (B) is smaller than the Mn of the polyamide resin (A) by at least 5000, even more preferably by at least 8000, and yet even more preferably by at least 10000. The upper limit of the difference between the Mn of the polyamide resin (B) and the Mn of the polyamide resin (A) is, for example, 25000 or less. By adopting such a constitution, the dispersibility and miscibility of the polyamide resin (A) and the polyamide resin (B) become favorable, and the transparency and gas-barrier properties tend to be more excellent.

The polyamide resin (B) used in an embodiment of the present invention preferably contains phosphorus atoms in a proportion of from 3 to 300 ppm by mass, more preferably in a proportion of from 4 to 250 ppm by mass, and even more preferably in a proportion from 20 to 200 ppm by mass, and yet even more preferably in a proportion from 20 to 100 ppm by mass, and further preferably from 20 to 50 ppm by mass.

Moreover, the polyamide resin (B) used in an embodiment the present invention preferably includes calcium atoms. By including calcium atoms, transparency can be further improved.

Furthermore, it is preferable that the polyamide resin (B) used in an embodiment of the present invention includes calcium atoms in such a ratio that the molar ratio of phosphorus atom:calcium atom will be 1:0.3 to 0.7. The molar ratio of phosphorus atom:calcium atom in the polyamide resin (B) used in an embodiment of the present invention is more preferably a ratio of 1:0.4 to 0.6, and even more preferably a ratio of 1:0.45 to 0.55, and yet even more preferably a ratio of 1:0.48 to 0.52.

It is more preferable that the polyamide resin (B) used in an embodiment of the present invention includes phosphorus atoms in a ratio from 3 to 300 ppm by mass, and includes calcium atoms in such a ratio that the molar ratio of phosphorus atom:calcium atom will be 1:0.3 to 0.7. By adopting such a constitution, a resin composition with higher transparency, low degree of yellowness (YI), and better transparency after heat treatment can be obtained. Preferably, the calcium atom is derived from calcium hypophosphite.

The phosphorus atom concentration and the calcium atom concentration are measured in accordance with the description in paragraph 0037 of WO 2017/090556, the contents of which are incorporated in this specification.

The resin composition of an embodiment of the present invention preferably contains from 10 to 90% by mass, and more preferably from 20 to 80% by mass, of the polyamide resin (B).

Composition of Resin Composition

The blend ratio of the polyamide resin (A) and the polyamide resin (B) in the resin composition of an embodiment of the present invention is from 90 to 10 parts by mass of the polyamide resin (B) with respect to from 10 to 90 parts by mass of the polyamide resin (A). It is preferable that from 80 to 20 parts by mass of polyamide resin (B) is included with respect to from 20 to 80 parts by mass of resin (A), more preferably from 77 to 23 parts by mass of polyamide resin (B) is included with respect to from 23 to 77 parts by mass of resin (A), further preferably from 55 to 23 parts by mass of polyamide resin (B) is included with respect to from 45 to 77 parts by mass of resin (A), even more preferably from 55 to 35 parts by mass of polyamide resin (B) is included with respect to from 45 to 65 parts by mass of resin (A), even further preferably from 55 to 40 parts by mass of polyamide resin (B) is included with respect to from 45 to 60 parts by mass of resin (A), and yet even further preferably from 55 to 45 parts by mass of polyamide resin (B) is included with respect to from 45 to 55 parts by mass of resin (A).

Each of the polyamide resin (A) and the polyamide resin (B) may be included as one type or may be included as two or more types. In a case where two or more types are included, the total amount is preferably within the range described above.

In the resin composition of an embodiment of the present invention, it is preferable that for both polyamide resin (A) and polyamide resin (B), 80 mol % or more, more preferably 90 mol % or more, even more preferably 95 mol % or more, and yet even more preferably 99 mol % or more, of the constituent units derived from a diamine is a polyamide resin derived from metaxylylenediamine. By adopting such a constitution, the gas-barrier properties tend to be more excellent.

Of all the constituent units constituting the polyamide resin included in the resin composition of an embodiment of the present invention, the proportion of the constituent units derived from isophthalic acid is preferably from 10 to 40 mol %, and more preferably from 20 to 40 mol %. By adopting such a range and such a constitution, moderate forming processability is maintained, and the gas-barrier properties become less likely to change due to humidity.

In the resin composition of an embodiment of the present invention, it is preferable that 60 mol % or more, more preferably 64 mol % or more, and even more preferably 67 mol % or more, of the constituent units constituting the polyamide resin (A) and the constituent units constituting the polyamide resin (B) is common therebetween. By adopting such a configuration, the miscibility of the polyamide resin (A) and the polyamide resin (B) can be improved, and a resin composition with excellent transparency can be obtained. The upper limit of the proportion of the common constituent units is 95 mol % or less, more preferably 90 mol % or less.

In the resin composition of an embodiment of the present invention, a polyamide resin (A), which is a crystalline polyamide resin, is blended with a polyamide resin (B), which is an amorphous polyamide resin. By adopting such a constitution, moderate forming processability is maintained, and the gas-barrier properties become less likely to change due to humidity.

Further, the degree of dispersion (Mw/Mn) of the polyamide resin (B) is preferably from 1.5 to 4.5, more preferably from 1.5 to 3.5, and even more preferably from 2.0 to 2.6. By adopting such a constitution, the film forming properties of the film can be further improved.

In the resin composition of an embodiment of the present invention, the polyamide resin (A) and the polyamide resin (B) preferably satisfy the relationship mentioned above in combination.

The resin composition of an embodiment of the present invention may or may not contain polyamide resins besides the polyamide resin (A) and the polyamide resin (B) described above. Specific examples of the other polyamide resins include polyamide 11, polyamide 12, MXD10 (polymetaxylylene sebasamide), MPXD10 (polymetaparaxylylene sebasamide), and PXD10 (polyparaxylylene sebasamide). One type each of these other polyamide resins, or two or more types thereof may be used.

The resin composition of an embodiment of the present invention can adopt such a constitution that it is substantially free of polyamide resins other than the polyamide resin (A) and the polyamide resin (B). "Substantially free" means that the content of the other polyamide resins is 5% by mass or less of the total content of the polyamide resin (A) and the polyamide resin (B), preferably 3% by mass or less, and more preferably 1% by mass or less.

An example of a preferred embodiment of the resin composition of an embodiment of the present invention is a resin composition which contains from 20 to 80 parts by mass of the polyamide resin (A) and from 80 to 20 parts by mass of the polyamide resin (B), wherein 90 mol % or more of the constituent units derived from a diamine in the polyamide resin (A) is derived from metaxylylenediamine, 90 mol % or more of the constituent units derived from a diamine in the polyamide resin (B) is derived from metaxylylenediamine, from 30 to 65 mol % of the constituent units derived from a dicarboxylic acid in the polyamide resin (B) is derived from adipic acid, and from 70 to 35 mol % of the constituent units derived from a dicarboxylic acid in the polyamide resin (B) is derived from isophthalic acid.

The resin composition of an embodiment of the present invention may contain components besides the polyamide resins described above. Examples of components other than the polyamide resins described above include fillers, matting agents, heat resistant stabilizers, weather resistant stabilizers, antioxidants, UV light absorbing agents, plasticizers, flame retardants, antistatic agents, coloring inhibitors, anti-gelling agents, impact modifiers, lubricants, coloring agents, conductive additives, and oxidation reaction accelerators. One type each of these additives, or two or more types thereof may be used.

Oxidation Reaction Accelerator

The resin composition of an embodiment of the present invention may contain an oxidation reaction accelerator. By including the oxidation reaction accelerator, the gas-barrier properties of the formed article made of the resin composition of an embodiment of the present invention can be further improved.

The oxidation reaction accelerator may be any material as long as it has an oxidation reaction promoting effect, but from the viewpoints of promoting the oxidation reaction of the polyamide resin, a compound containing a transition metal element is preferable. The transition metal element is preferably at least one selected from transition metals of Group VIII of the Periodic Table of Elements, manganese, copper, and zinc; from the viewpoints of effectively expressing oxygen absorption capacity, at least one selected from cobalt, iron, manganese, and nickel is more preferable, and cobalt is even more preferable.

In addition to the metal single substance described above, such an oxidation reaction accelerator is used in the form of a low-valent oxide, an inorganic acid salt, an organic acid salt or a complex salt containing the metals mentioned above. Examples of the inorganic acid salt include halides such as chlorides or bromides, carbonates, sulfates, nitrates, phosphates, and silicates. Meanwhile, examples of the organic acid salt include carboxylates, sulfonates, and phosphonates. In addition, transition metal complexes with β-diketones or β-keto acid esters can also be used.

In particular, in an embodiment of the present invention, since oxygen absorption capacity is well expressed, it is preferable to use at least one selected from carboxylates, carbonates, acetylacetonate complexes, oxides, and halides containing the metal atoms described above. It is more preferable to use at least one selected from octanoates, neodecanoates, naphthenates, stearates, acetates, carbonates and acetylacetonate complexes, even more preferably, from cobalt carboxylates such as cobalt octoate, cobalt naphthenate, cobalt acetate, and cobalt stearate.

The oxidation reaction accelerator described above not only promotes the oxidation reaction of the polyamide resin, but also functions as a catalyst for the oxidation reaction of an organic compound having an unsaturated carbon bond or a compound having secondary or tertiary hydrogen in the molecule. Therefore, in order to further increase oxygen absorption capacity, various compounds can be compounded with the resin composition of an embodiment of the present invention in addition to the oxidation reaction accelerator described above; the various compounds are exemplified by polymers or oligomers of unsaturated hydrocarbons such as polybutadiene and polyisoprene, compounds having xylylenediamine as a skeleton, or compounds having a functional group added to enhance miscibility between the compounds and polyesters.

When the oxidation reaction accelerator contains a transition metal element, from the viewpoints of promoting the oxidation reaction of the polyamide resin and increasing the oxygen absorption capacity of the formed article, the content of the transition metal element in the resin composition is preferably from 10 to 1000 ppm by mass, more preferably from 20 to 500 ppm by mass, and even more preferably from 40 to 300 ppm by mass.

The transition metal concentration in the formed article can be measured with known methods such as ICP emission spectroscopy, ICP mass spectrometry, and X-ray fluorescence analysis.

The oxidation reaction accelerator may be used alone, or a combination of two or more types of the oxidation reaction accelerators may be used. When two or more types are used in combination, the total amount is preferably within the range described above.

Physical Properties of Resin Composition

The haze of the resin composition of an embodiment of the present invention when formed into a single-layer film having a thickness of 100 m may be 2.5% or less; further, the haze may be 1.0% or less, particularly 0.7% or less, 0.6% or less, or 0.5% or less. The lower limit of the haze is desirably 0%, but 0.1% or more, or even 0.2% or more can sufficiently satisfy the required performance. The haze is measured according to the method described in the examples described below.

The oxygen transmission coefficient ($OTC_{60}$) at 23° C. and a relative humidity of 60% of the resin composition of an embodiment of the present invention when formed into a single-layer film having a thickness of 100 μm may be 1 cc·mm/(m²·day·atm) or less, further may be 0.1 cc·mm/(m²·day·atm) or less, particularly may be 0.09 cc·mm/(m²·day·atm) or less. The lower limit of the oxygen transmission coefficient at 23° C. and a relative humidity of 60% is preferably 0 cc·mm/(m²·day·atm), but 0.01 cc·mm/(m²·day·atm) or more can sufficiently satisfy the required performance. In addition, the oxygen transmission coefficient ($OTC_{90}$) at 23° C. and a relative humidity of 90% of the resin composition of an embodiment of the present invention when formed into a single-layer film having a thickness of 100 μm may be 2.0 cc·mm/(m²·day·atm) or less, further may be 1.0 cc·mm/(m²·day·atm) or less, particularly may be 0.3 cc·mm/(m²·day·atm) or less. The lower limit of the oxygen transmission coefficient at 23° C. and a relative humidity of 90% is preferably 0 cc·mm/(m²·day·atm), but 0.05 cc·mm/(m²·day·atm) or higher may sufficiently satisfy the required performance.

Further, the rate of change ($OTC_{90}$)($OTC_{90}/OTC_{60}$) of the oxygen transmission coefficient measured in an atmosphere of 23° C. and a relative humidity (RH) of 90% with respect to the oxygen transmission coefficient ($OTC_{60}$) measured in an atmosphere of a relative humidity (RH) of 60% of the resin composition of an embodiment of the present invention may be less than 5.5, even less than 4.5, and in particular less than 2.8. The lower limit is not particularly set, but can be, for example, 1.0 or more, 1.2 or more, 1.5 or more, and 1.7 or more.

The oxygen transmission coefficient (OTC) is measured according to the method described in the examples described below.

Method of Producing Resin Composition

Any method could be adopted as a method of producing the resin composition. Examples include a method including mixing a polyamide resin and other components that are compounded as necessary using a mixing means, such as a V-type blender, to prepare a batch blended product, and then melt-kneading the mixture in a vented extruder to produce pellets. Alternatively, a method of dry-blending each resin, a method of melt-blending in advance, or a method of partially master-batching and diluting may be employed.

The heating temperature at the time of melt-kneading can be selected accordingly from a range from 190 to 350° C. depending on the melting point of the resin. In a case where the temperature is too high, decomposed gas is likely to be generated, which may cause opacification. Therefore, it is desirable to select a screw configuration in consideration of shear heat generation and the like. Furthermore, from the viewpoints of suppressing decomposition during kneading or molding in the subsequent steps, it is desirable to use an antioxidant or a thermal stabilizer.

Formed Product

The present invention also relates to a formed article formed from the resin composition of an embodiment of the present invention. Furthermore, the present invention relates to a formed article having a layer formed from the resin composition of an embodiment of the present invention. That is, the resin composition of an embodiment of the present invention could be formed into various formed articles. The method of producing the formed article using the resin composition of an embodiment of the present invention is not particularly limited, and a molding method commonly used for thermoplastic resins, that is, molding methods such as injection molding, hollow molding, extrusion molding, and press molding, can be applied.

Examples of the formed article include single layer films (which are intended to include single-layer sheets), multi-layer films (which are intended to include multi-layer sheets), fibers, yarns, ropes, tubes, hoses, various molding materials, containers, various parts, finished goods, housings, and shrink packaging materials (shrink films, shrink tubes, and the like). Furthermore, the formed articles (in particular, films) may be stretched. The stretching may be uniaxial stretching or biaxial stretching. Moreover, the biaxial stretching may be simultaneous stretching or sequential stretching. In addition, the stretch ratio is preferably from 1.1 to 5.0 times for each of the MD (Machine Direction) and TD (Transverse Direction). Also, the area stretch ratio is preferably from 1 to 25 times.

The resin composition of an embodiment of the present invention can be widely used in, for example, components for transportation devices such as automobiles, general mechanical components, precision mechanical components, electronic and electrical device components, OA device components, building materials and building-related components, medical devices, leisure sports goods, game devices, containers for medical products and food, and defense and aerospace products.

Film

The present invention also relates to a film formed from the resin composition of an embodiment of the present invention. The film of an embodiment of the present invention can be used as a single-layer film or a multi-layer film.

The thickness of the single-layer film can be from 5 to 1000 μm, and can further be from 15 to 500 μm, and can particularly be from 50 to 200 μm.

The single-layer film can be preferably utilized in packaging containers such as wraps, or pouches of various shapes, lid materials for containers, bottles, cups, trays, and tubes.

The multi-layer film is a multi-layer film containing at least one layer formed from the resin composition of an embodiment of the present invention. The multi-layer film can be preferably utilized in packaging containers such as wraps, or pouches of various shapes, lid materials for containers, bottles, cups, trays, and tubes.

The details of the single-layer film and the multi-layer film can be referred to the description of paragraphs 0085 to 0123 of JP 2016-169291A, the contents of which are incorporated in the present specification.

Container

The resin composition of an embodiment of the present invention is preferably used in a container. The shape of the container is not particularly limited, and may be, for example, a molded container such as a bottle, a cup, a tube, a tray, or a Tupperware, or may be a bag-shaped container such as a pouch, a standing pouch, or a zipper storage bag.

The container can store and preserve a variety of items for which the contents are desired to be visualized in order to motivate the customer to purchase. Examples include processed seafood products, processed animal products, rice, and liquid food. In particular, it is suitable for preserving foods that are sensitive to oxygen. The details of these can be referred to the description in paragraphs 0032 to 0035 of JP 2011-37199A, the contents of which are incorporated in the present specification.

EXAMPLES

The embodiments of the present invention are described more specifically below through examples. The materials, usage amounts, proportions, processing contents, processing procedures, and the like described in the examples below may be changed, as appropriate, as long as there is no deviation from the spirit of the present invention. Therefore, the scope of the present invention is not limited to the specific examples described below.

Synthesis Example A-1

A 50 L jacket-equipped reactor provided with a stirrer, a partial condenser, a cooler, a thermometer, a dropping tank, and a nitrogen gas introducing tube was charged with 15 kg of adipic acid, 13.1 g of sodium hypophosphite monohydrate, and 6.9 g of sodium acetate and then thoroughly substituted with nitrogen. Furthermore, the temperature was raised to 180° C. in a small amount of a nitrogen gas stream, thus uniformly dissolving the adipic acid. Then, 13.9 kg of metaxylylenediamine was added dropwise over 170 minutes while stirring the inside of the system. During this time, the inner temperature was continuously raised to 245° C. The water generated by polycondensation was removed from the system through the partial condenser and the cooler. After completion of the dropwise addition of metaxylylenediamine, the inner temperature was further raised to 260° C., and the reaction was continued for one hour; thereafter, from a nozzle in a lower part of the reactor, the polymer was taken out as a strand, water-cooled and pelletized to obtain a polymer.

Next, the polymer obtained by the operations described above was put into a 50 L rotary-type tumbler provided with a heating jacket, a nitrogen gas introducing tube, and a vacuum line, and an operation of reducing the pressure inside the system while rotating and then bringing back to atmospheric pressure with nitrogen having a purity of 99% by volume or more was performed three times. Thereafter, the inside of the system was subjected to temperature rise to 140° C. in a nitrogen gas stream. Next, the pressure inside the system was reduced, and the temperature was continuously raised to 190° C. and held for 30 minutes at 190° C. Then, nitrogen was introduced to bring back the inside of the system to atmospheric pressure, followed by cooling to obtain a polyamide resin A-1.

The melting point of the obtained polyamide resin was 237° C., and the number average molecular weight was 26,000.

Synthesis Example B-1

The polyamide resin B-1 shown in Table 1 was synthesized according to the following method.

A reaction vessel provided with a stirrer, a partial condenser, a total condenser, a thermometer, a dropping funnel, a nitrogen introducing tube, and a strand die was charged with 6,001 g (41.06 mol) of accurately weighed adipic acid, 6,821 g (41.06 mol) of isophthalic acid, and 1.73 g of calcium hypophosphate ($Ca(H_2PO_2)_2$) (the phosphorus atom concentration in the polyamide resin being 30 ppm by mass), and 1.11 g of sodium acetate and then thoroughly substituted with nitrogen. Nitrogen was charged to an internal pressure of 0.4 MPa, and the inside of the system was heated to 190° C. while stirring in a small amount of a nitrogen gas stream. The molar ratio of sodium acetate/calcium hypophosphate was 1.33.

11,185 g (82.12 mol) of metaxylylenediamine was added dropwise to the system under stirring, and the temperature inside the system was continuously raised while the condensation water generated was being removed from the system. After dropwise addition of metaxylylenediamine was completed, the internal temperature was raised; when the temperature reached 265° C., the pressure inside the reaction vessel was reduced. The internal temperature was then further raised, and the melt polycondensation reaction was continued for 10 minutes at 270° C. Next, the inside of the system was pressurized with nitrogen, and the obtained polymer was removed from the strand die and pelletized to obtain about 21 kg of polyamide resin pellets B-1. The obtained polyamide resin (B-1) was vacuum dried at 115° C. for 24 hours.

The resin B-1 was found to be amorphous, as the crystal melting enthalpy ΔHm was approximately 0 J/g in the temperature rising process. The number average molecular weight was 13,500.

Synthesis Example B-2

Except that the molar ratio of adipic acid to isophthalic acid was adjusted to be 40:60, the procedures were carried out in the same manner as in Synthesis example B-1 to obtain a polyamide resin B-2. The obtained polyamide resin (B-2) was vacuum dried at 115° C. for 24 hours.

The resin B-2 was found to be amorphous, as the crystal melting enthalpy ΔHm was approximately 0 J/g in the temperature rising process. The number average molecular weight was 13,000.

Synthesis Example B-3

Except that the molar ratio of adipic acid to isophthalic acid was adjusted to be 60:40, the procedures were carried out in the same manner as in Synthesis example B-1, to obtain a polyamide resin B-3. The obtained polyamide resin (B-3) was vacuum dried at 105° C. for 24 hours.

The resin B-3 was found to be amorphous, as the crystal melting enthalpy ΔHm was approximately 0 J/g in the temperature rising process. The number average molecular weight was 13,800.

Synthesis Example B-4

6,001 g (41.06 mol) of accurately weighed adipic acid, 6,821 g (41.06 mol) of isophthalic acid, and 11,185 g (82.12 mol) of metaxylylenediamine were mixed at an internal temperature of 115° C. in a conditioning vessel provided with a stirrer, a partial condenser, a thermometer, a dropping funnel, and a nitrogen introducing tube. Next, 1.73 g of calcium hypophosphate ($Ca(H_2PO_2)_2$) (the phosphorus atom concentration in the polyamide resin being 30 ppm by mass), and 1.11 g of sodium acetate was added and stirred for 30 minutes to form a mixed solution of salts. The mixed solution was transferred to a reaction vessel, and was reacted by stirring under the conditions of an internal temperature of 190° C. and an internal pressure of 1.0 MPa of the vessel. The distilled water was removed from the system, and when the temperature in the vessel reached 270° C., the internal pressure of the vessel was brought back to atmospheric pressure over 60 minutes. Stirring was carried out at atmospheric pressure, and at the moment when a predetermined melt viscosity was reached, the stirring was stopped and left for 30 minutes. Thereafter, the molten resin was removed from the strand die at the lower part of the reaction vessel, and was pelletized after water cooling to obtain approximately 21 kg of polyamide resin pellets (B-4). The obtained polyamide resin (B-4) was vacuum dried at 115° C. for 24 hours.

The resin B-4 was found to be amorphous, as the crystal melting enthalpy ΔHm was approximately 0 J/g in the temperature rising process. The number average molecular weight was 13,500.

Method for Measuring Phosphorus Atom Concentration 0.2 g of a polyamide resin and 8 mL of a 35% by mass aqueous solution of nitric acid were placed in a TFM-modified PTFE container (available from 3M Company), and microwave decomposition was performed for 30 minutes at an internal temperature of 230° C. using ETHOS One (available from Milestone General Co., Ltd). The decomposition solution was made up to a volume with ultrapure water and used as an ICP measurement solution. The phosphorus atom concentration was measured using ICPE-9000, available from Shimadzu Corporation.

Measurement of Degree of Dispersion (Mw/Mn)

The degree of dispersion was determined by GPC measurement. Specifically, the degree of dispersion was determined from the measurement using "HLC-8320GPC" available from Tosoh Corporation as an apparatus, two "TSK gel Super HM-H" available from Tosoh Corporation as columns, under the condition of hexafluoroisopropanol having a sodium trifluoroacetate concentration of 10 mmol/L as an eluent, a resin concentration of 0.02% by mass, a column temperature of 40° C., a flow rate of 0.3 mL/min, and a refractive index detector (RI). The measurement was calibrated using a polymethylmethacrylate standard. The calibration curve was prepared by measurement of 6 levels of PMMA dissolved in HFIP.

Example 1

Production of Single-Layer Film

The polyamide resin (A) pellets and polyamide resin (B) pellets shown in Table 1 were dry-blended at the ratios shown in Table 1, and then fed to a single screw extruder with T die (PTM-30, available from Research Laboratory of Plastics Technology Co., Ltd.) and kneaded. Extrusion was performed at an extrusion temperature of 260° C. to produce a single-layer film with a width of 150 mm and a thickness of 100 μm.

Evaluation of Transparency

The haze (HAZE) of the single-layer film obtained above was measured. The haze measurement was performed according to JIS K7136.

Evaluation of Oxygen-Barrier Properties

The oxygen transmission coefficient (OTC) of the single-layer film obtained above was measured by an isobaric method in an atmosphere of 23° C. and a relative humidity (RH) of 60%. In addition, the oxygen transmission coefficient of the single-layer film obtained above was measured by an isobaric method in an atmosphere of 23° C. and a relative humidity (RH) of 90%.

The oxygen transmission coefficient was measured using an oxygen transmission rate measurement device (available from MOCON, product name: "OX-TRAN (trade name) 2/21").

Humidity Dependence of Oxygen-Barrier Properties

The rate of change of oxygen transmission coefficient measured in an atmosphere of 23° C. and a relative humidity (RH) of 90% with respect to the oxygen transmission coefficient measured in an atmosphere of 23° C. and a relative humidity (RH) of 60% was evaluated as follows. Evaluation C or higher is a practical level.

A: $OTC_{90}/OTC_{60}$ is less than 2.8
B: $OTC_{90}/OTC_{60}$ is 2.8 or more and less than 4.5
C: $OTC_{90}/OTC_{60}$ is 4.5 or more and less than 5.5
D: $OTC_{90}/OTC_{60}$ is 5.5 or more Film Forming Properties of Film The film forming properties of the single-layer film (width 150 mm) obtained above was evaluated as follows. The difference in thickness of a portion (the endmost portion) at a distance of 15 mm from the end with respect to the central portion in the width direction of the single-layer film was calculated and evaluated as follows. C or higher is a practical level.

[(central portion in the width direction–thickness of endmost portion)/central portion in the width direction]×100(unit: %)

A: less than ±7%
B: less than ±8.5% (except those that fall under A)
C: less than ±10% (except those that fall under A and B)
D: ±10% or more Examples 2 to 6 and Reference Example 1

Single-layer films of Examples 2 to 6 and Reference Example 1 were obtained by making changes to Example 1 as shown in Table 1 below while carrying out the other procedures in the same manner as in Example 1.

Evaluation was performed in the same manner as in Example 1.

TABLE 1

| | | Example 1 | Example 2 | Example 3 | Example 4 | Example 5 | Example 6 | Reference Example 1 |
|---|---|---|---|---|---|---|---|---|
| Polyamide resin (A) | Types of polyamide resin (A) | A-1 | A-1 | A-1 | A-1 | A-1 | A-1 | A-1 |
| | Phosphorus atom concentration (mass ppm) | 151 | 151 | 151 | 151 | 151 | 151 | 151 |
| Polyamide resin (B) | Types of polyamide resin (B) | B-1 | B-2 | B-3 | B-1 | B-1 | B-4 | — |
| | Constituent units of diamine MXDA | 100 | 100 | 100 | 100 | 100 | 100 | — |

TABLE 1-continued

|  |  | Example 1 | Example 2 | Example 3 | Example 4 | Example 5 | Example 6 | Reference Example 1 |
|---|---|---|---|---|---|---|---|---|
| Constituent units of dicarboxylic acid | Adipic acid | 50 | 40 | 60 | 50 | 50 | 50 | — |
|  | Isophthalic acid | 50 | 60 | 40 | 50 | 50 | 50 | — |
| Degree of dispersion | Mw/Mn | 2.2 | 2.4 | 2.1 | 2.2 | 2.2 | 4.2 | — |
| Phosphorus atom concentration (mass ppm) |  | 30 | 30 | 30 | 30 | 30 | 30 | — |
| Polyamide resin (A): polyamide resin (B) (mass ratio) |  | 50:50 | 50:50 | 50:50 | 25:75 | 75:25 | 50:50 | 100:0 |
| Phosphorus concentration in all polyamide resins (mass ppm) |  | 91 | 91 | 91 | 60 | 121 | 91 | 151 |
| Transparency evaluation (HAZE) (%) |  | 0.3 | 0.4 | 0.4 | 0.3 | 0.5 | 0.6 | 0.8 |
| Oxygen-barrier evaluation (cc · mm/(m$^2$ · day · atm)) 23° C./60% RH |  | 0.08 | 0.08 | 0.08 | 0.08 | 0.08 | 0.09 | 0.08 |
| Oxygen-barrier evaluation (cc · mm/(m$^2$ · day · atm)) 23° C./90% RH |  | 0.2 | 0.17 | 0.23 | 0.14 | 0.24 | 0.23 | 0.4 |
| OTC$_{90}$/OTC$_{60}$ |  | 2.5 | 2.1 | 2.9 | 1.8 | 3.0 | 2.6 | 5.0 |
| Humidity dependence of oxygen-barrier properties |  | A | A | B | A | B | A | C |
| Film forming properties of film |  | A | A | A | A | A | C | A |

As is clear from the above results, it was found that the resin composition of the present invention had high transparency and oxygen-barrier properties thereof were less apt to depend on humidity (Examples 1 to 6).

Further, by using a polyamide resin having a degree of dispersion in the range of from 1.5 to 3.5 as the polyamide resin (B), a film having more excellent film forming properties was obtained (Examples 1 to 5).

In contrast, when only the polyamide resin (A) was compounded and the polyamide resin (B) was not compounded (Reference Example 1), the oxygen-barrier properties, although being at a practical level, were more apt to depend on humidity than that of the resin composition of an embodiment of the present invention.

In addition, in Examples 1 to 6, an oxidation reaction accelerator (cobalt stearate (II), available from Tokyo Chemical Industry Co., Ltd.) was compounded so as to be 100 ppm by mass with respect to 100 parts by mass of the polyamide resin component, and the other procedures were carried out in the same manner to obtain a film. Both OTC$_{90}$ and OTC$_{60}$ were 0.01 cc·mm/(m$^2$·day·atm) or less.

The invention claimed is:

1. A resin composition comprising from 10 to 90 parts by mass of a polyamide resin (A) and from 90 to 10 parts by mass of a polyamide resin (B), wherein
   the polyamide resin (A) includes constituent units derived from a diamine and constituent units derived from a dicarboxylic acid, 70 mol % or more of the constituent units derived from a diamine being derived from xylylenediamine and more than 90 mol % of the constituent units derived from a dicarboxylic acid being derived from adipic acid;
   the polyamide resin (B) includes constituent units derived from a diamine and constituent units derived from a dicarboxylic acid, 70 mol % or more of the constituent units derived from a diamine being derived from xylylenediamine, from 30 to 65 mol % of the constituent units derived from a dicarboxylic acid being derived from an α, ω-linear chain aliphatic dicarboxylic acid having from 4 to 20 carbons, from 70 to 35 mol % of the constituent units derived from a dicarboxylic acid being derived from isophthalic acid, where the total not exceeding 100 mol %.

2. The resin composition according to claim 1, wherein 70 mol % or more of the constituent units derived from a diamine in the polyamide resin (A) is derived from metaxylylenediamine.

3. The resin composition according to claim 1, wherein 70 mol % or more of the constituent units derived from a diamine in the polyamide resin (B) is derived from metaxylylenediamine.

4. The resin composition according to claim 1, wherein from 30 to 65 mol % of the constituent units derived from a dicarboxylic acid in the polyamide resin (B) is derived from adipic acid.

5. The resin composition according to claim 1, comprising from 20 to 80 parts by mass of the polyamide resin (A) and from 80 to 20 parts by mass of the polyamide resin (B), wherein
   90 mol % or more of the constituent units derived from a diamine in the polyamide resin (A) is derived from metaxylylenediamine,
   90 mol % or more of the constituent units derived from a diamine in the polyamide resin (B) is derived from metaxylylenediamine,
   from 30 to 65 mol % of the constituent units derived from a dicarboxylic acid in the polyamide resin (B) is derived from adipic acid, and from 70 to 35 mol % of the constituent units derived from a dicarboxylic acid in the polyamide resin (B) is derived from isophthalic acid.

6. The resin composition according to claim 5, wherein the polyamide resin (B) is an amorphous polyamide resin.

7. The resin composition according to claim 5, wherein the polyamide resin (A) is a crystalline polyamide resin, the polyamide resin (B) is an amorphous polyamide resin, and 60 mol % or more of the constituent units constituting the polyamide resin (A) and 60 mol % or more of the constituent units constituting the polyamide resin (B) are common.

8. The resin composition according to claim 5, wherein an Mw/Mn, which is the degree of dispersion of the polyamide resin (B), is from 1.5 to 3.5.

9. The resin composition according to claim 1, wherein from 30 to 59 mol % of the constituent units derived from a dicarboxylic acid in the polyamide resin (B) is derived from adipic acid, and from 70 to 41 mol % of the constituent units derived from a dicarboxylic acid in the polyamide resin (B) is derived from isophthalic acid.

10. The resin composition according to claim 9, wherein the polyamide resin (B) is an amorphous polyamide resin.

11. The resin composition according to claim 9, wherein the polyamide resin (A) is a crystalline polyamide resin, the polyamide resin (B) is an amorphous polyamide resin, and 60 mol % or more of the constituent units constituting the polyamide resin (A) and 60 mol % or more of the constituent units constituting the polyamide resin (B) are common.

12. The resin composition according to claim 9, wherein an Mw/Mn, which is the degree of dispersion of the polyamide resin (B), is from 1.5 to 3.5.

13. The resin composition according to claim 9,
wherein the polyamide resin (B) is an amorphous polyamide resin,
the polyamide resin (A) is a crystalline polyamide resin, and
60 mol % or more of the constituent units constituting the polyamide resin (A) and 60 mol % or more of the constituent units constituting the polyamide resin (B) are common.

14. The resin composition according to claim 1, wherein the polyamide resin (B) is an amorphous polyamide resin.

15. The resin composition according to claim 1, wherein the polyamide resin (A) is a crystalline polyamide resin, the polyamide resin (B) is an amorphous polyamide resin, and 60 mol % or more of the constituent units constituting the polyamide resin (A) and 60 mol % or more of the constituent units constituting the polyamide resin (B) are common.

16. The resin composition according to claim 1, wherein an Mw/Mn, which is the degree of dispersion of the polyamide resin (B), is from 1.5 to 3.5.

17. A formed article formed from the resin composition described in claim 1.

18. A formed article having a layer made from the resin composition described in claim 1.

19. A film formed from the resin composition described in claim 1.

20. The film according to claim 19, wherein the film is stretched.

* * * * *